(12) United States Patent
Dewey

(10) Patent No.: US 7,080,223 B2
(45) Date of Patent: Jul. 18, 2006

(54) APPARATUS AND METHOD TO MANAGE AND COPY COMPUTER FILES

(75) Inventor: Douglas W. Dewey, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 326 days.

(21) Appl. No.: 10/272,732

(22) Filed: Oct. 15, 2002

(65) Prior Publication Data

US 2004/0073624 A1    Apr. 15, 2004

(51) Int. Cl.
G06F 12/16 (2006.01)
G06F 15/167 (2006.01)

(52) U.S. Cl. .................. 711/162; 711/114; 709/213
(58) Field of Classification Search ............ 711/114, 711/161, 162, 213
See application file for complete search history.

(56) References Cited

U.S. PATENT DOCUMENTS

| 5,809,511 | A | 9/1998 | Peake | 707/204 |
|---|---|---|---|---|
| 5,835,954 | A | 11/1998 | Duyanovich et al. | 711/162 |
| 6,029,179 | A | 2/2000 | Kishi | 707/202 |
| 6,105,037 | A | 8/2000 | Kishi | 707/201 |
| 6,189,079 | B1 | 2/2001 | Micka et al. | 711/162 |
| 6,226,711 | B1 | 5/2001 | Fisher et al. | 711/111 |
| 6,269,382 | B1 | 7/2001 | Cabrera et al. | 707/204 |
| 6,269,423 | B1 | 7/2001 | Kishi | 711/113 |
| 6,282,609 | B1 | 8/2001 | Carlson | 711/112 |
| 2001/0002477 | A1 | 5/2001 | Cadden et al. | 711/111 |

Primary Examiner—Jack A. Lane
(74) Attorney, Agent, or Firm—Dale F. Regelman

(57) ABSTRACT

A network attached storage device ("NASD"), where that NASD is capable of communicating with one or more host computers, and where that NASD is capable of communicating with one or more data storage and retrieval systems. The network attached storage device includes an information storage device, a first file system driver, where that first file system driver is in communication with the information storage device, and a second file system driver, where that second file system driver is in communication with the first file system driver. The network attached storage device further includes a plurality of first computer files stored on the information storage device, and a plurality of second computer files, where one or more of the plurality of first computer files comprises two or more of the plurality of second computer files.

7 Claims, 9 Drawing Sheets

FIG. 3 - PRIOR ART

APPARATUS AND METHOD TO MANAGE AND COPY COMPUTER FILES

FIELD OF THE INVENTION

This invention relates to an apparatus and method to manage and copy computer files. In certain embodiments, Applicant's invention includes an apparatus and method to copy one or more host computer files using a network attached storage device and a data storage and retrieval system.

BACKGROUND OF THE INVENTION

Irretrievable loss of information stored in a computer system is highly undesirable. As a general matter, information is stored in a computer system in one or more files. To prevent loss of data, computer files are typically "backed up" periodically. Copies of computer files, i.e. backup files, are created and stored in a location separate from the file-generating computer systems. Such backup files allow recovery of information in the event of a system crash, natural disaster, or operator error that causes data stored on the system to be destroyed or lost.

One problem associated with backing up computer files is the speed of the process, i.e., the time required to create and write such a backup file. Often either the backup media or the connection between the computer system and the backup media is limited to data transfer rates which are substantially slower than the speed of the computer system on which the data is stored. For example, when backing up a host computer to a data storage device, such as a tape drive, over a network, the software orchestrating the creation and saving of the backup file, and the data transfer rate of the data storage device, are likely to be limiting factors in the overall speed of backup file creation and storage. Allocating substantial amounts of the host computer's time and resources to create and save backup files is undesirable.

Automated media storage libraries are known for providing cost effective access to large quantities of stored information, such as backup computer files. Generally, media storage libraries include a large number of storage slots on which are stored portable data storage media. The typical portable data storage media is a tape cartridge, an optical cartridge, a disk cartridge, electronic storage media, and the like. By electronic storage media, Applicants mean a device such as a PROM, EPROM, EEPROM, Flash PROM, and the like, One (or more) accessors typically retrieve portable data storage media from the storage slots and deliver that accessed media to a data storage device for reading and/or writing data thereon. Suitable electronics operate the accessor(s) and operate the data storage device(s) to provide information to, and/or to receive information from, one or more attached host computer systems.

In a conventional automated media storage library, the storage slots are arranged in a planar orthogonal arrangement forming a "wall" of storage slots for holding data storage media. The plane may be a flat plane, or may be a cylindrical plane. To double the storage capacity, two "walls" of storage slots may be provided on either side of the accessor.

A number of different companies manufacture automated media storage libraries today, each model displaying various different features. One example is the IBM 3584 Media Storage Library. Some of the automated media storage libraries have dual or multiple accessors to provide a level of redundancy and to enhance performance.

In order to most efficiently backup information stored on a host computer what is needed is a method employing time efficient copy protocols, i.e. fast software, in combination with a communication link having a high data transfer rate to a data storage device, where that method minimizes the overhead processing time required by the host computer, to create and save backup files on cost-effective data storage media.

SUMMARY OF THE INVENTION

Applicants' invention includes a network attached storage device ("NASD"), where that NASD is capable of communicating with one or more host computers, and where that NASD is capable of communicating with one or more data storage and retrieval systems. Applicant's network attached storage device includes an information storage device, a first file system driver, where that first file system driver is in communication with the information storage device, and a second file system driver, where that second file system driver is in communication with the first file system driver. Applicant's network attached storage device further includes a plurality of first computer files stored on the information storage device, and a plurality of second computer files, where one or more of the plurality of first computer files comprises two or more of the plurality of second computer files.

Applicant's invention further includes a method to copy host computer files using Applicant's NASD and a data storage and retrieval system. Applicants' invention further includes an article of manufacture comprising a computer useable medium having computer readable program code disposed therein method to copy one or more host computer files to one or more portable information storage media. Applicants' invention further includes a computer program product usable with a programmable computer processor having computer readable program code embodied therein method to copy one or more host computer files to one or more portable information storage media.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. The invention will be described as embodied in an apparatus and method to copy one or more host computer files. The following description of Applicant's apparatus and method is not meant, however, to limit Applicant's invention to data processing applications, as the invention herein can be applied generally to computer file storage and management.

Figure 1:
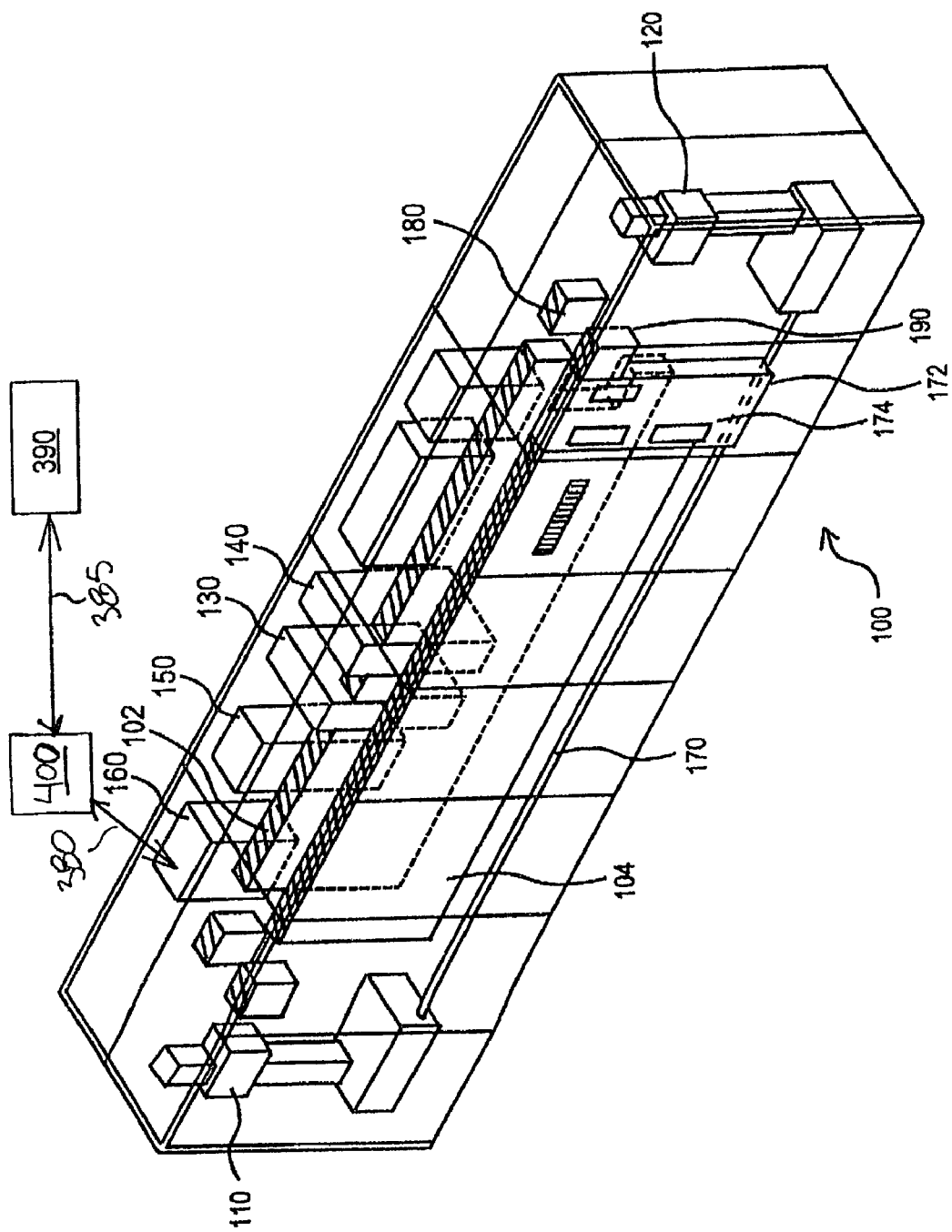
FIG. 1 is a perspective view of one embodiment of Applicant's data storage and retrieval system.
Figure 3:
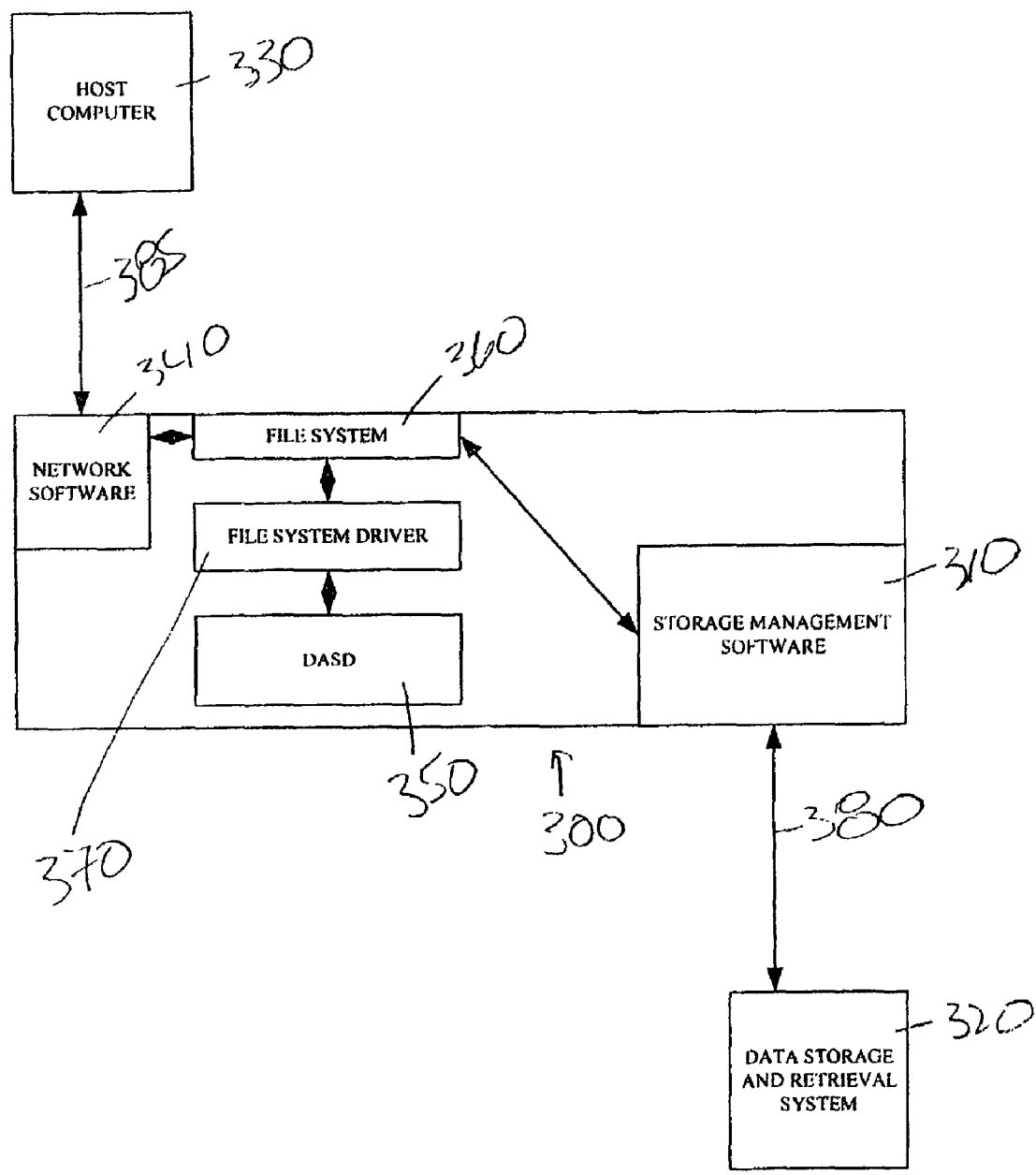
FIG. 3 is a block diagram of a prior art network attached storage device.
Figure 4:
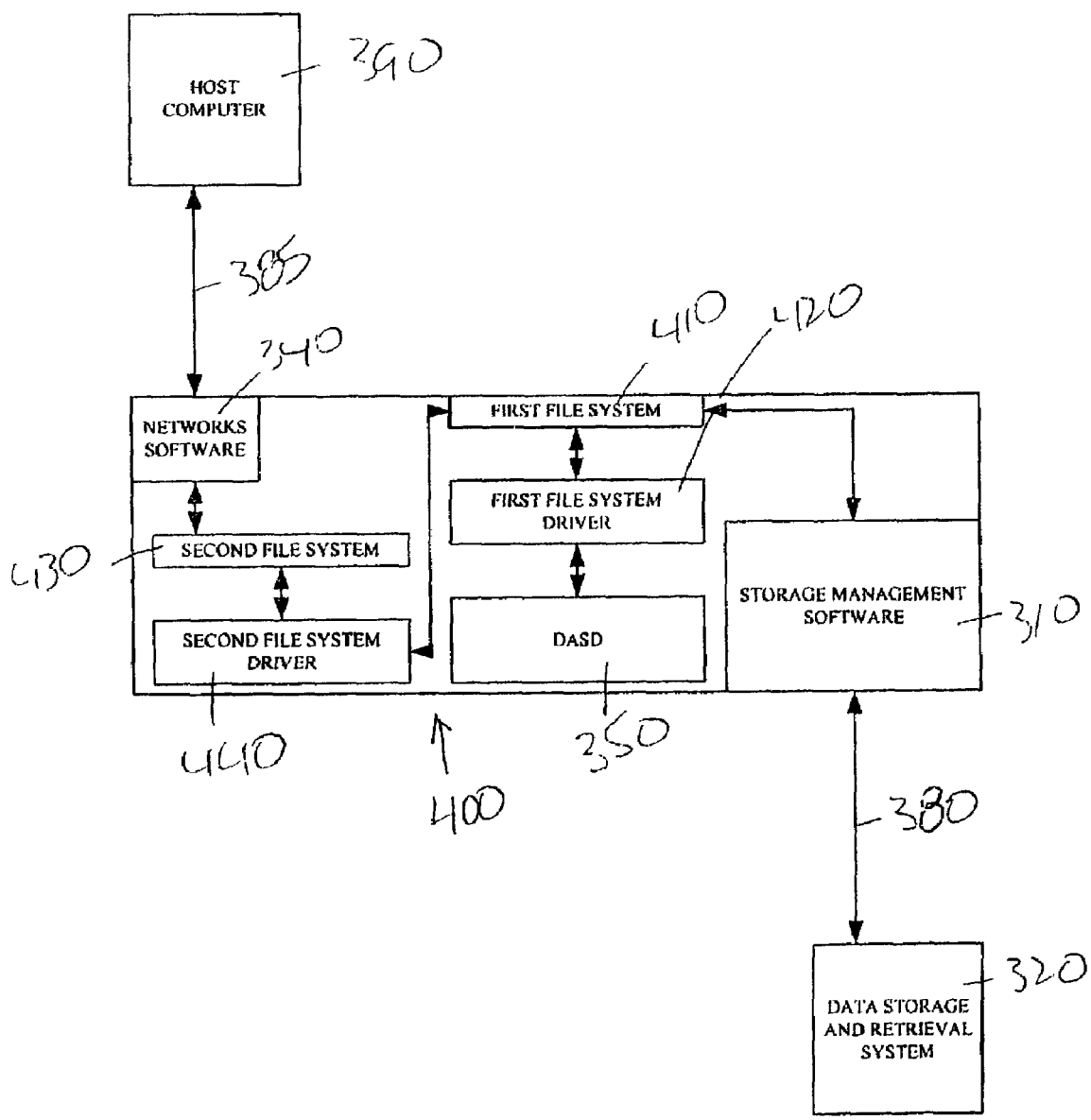
FIG. 4 is a block diagram of Applicant's network attached storage device.

Referring now to FIG. 1, data storage and retrieval system 100 communicates with one or more host computers, such as host computer 390, via one or more communication links, such as communication links 380 (FIGS. 1, 2, 3, 4) and 385 (FIGS. 1, 2, 3, 4, 6A, 6B, 7) and a Network Attached Storage ("NASD") device, such NASD 400 (FIG. 4). Communication links 380 and 385 comprise, for example, a serial interconnection, such as an RS-232 cable or an RS-432 cable, an ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

Data storage and retrieval system 100 includes first wall of storage slots 102 and second wall of storage slots 104. Portable information storage media are individually stored in these storage slots. In certain embodiments, such information storage media are individually housed in portable cartridges/cassettes. Examples of such information storage media include magnetic tapes, magnetic disks of various types, optical disks of various types, electronic storage media, and the like.

Applicant's automated data storage and retrieval system includes one or more accessors, such as accessors 110 and 120. An accessor is a robotic device which accesses portable data storage media from first storage wall 102 or second storage wall 104, transports that accessed media to input/output devices 130/140 for reading and/or writing data thereon, and returns the media to the proper storage slot. As shown in FIG. 1, accessors 110 and 120 travel bi-directionally along rail 170 in an aisle disposed between first wall of storage slots 102 and second wall of storage slots 104. U.S. Pat. No. 6,038,490, entitled "Automated Data Storage Dual Picker Interference Avoidance," teaches a method to prevent collisions occurring between accessors moveably disposed on the same rail system, and is hereby incorporated by reference herein.

In certain embodiments, device 160 comprises a library controller. In certain of these embodiments, library controller 160 is integral with a computer. In other embodiments, Applicants' data storage and retrieval system utilizes a distributed control network. In these distributed control network embodiments, device 160 comprises a motion card pack.

Referring again to FIG. 1, operator input station 150 permits a user to communicate with Applicant's automated data storage and retrieval system 100. Power component 180 and power component 190 each comprise one or more power supply units which supply power to the individual components disposed within Applicant's automated data storage and retrieval system. Import/export station 172 includes access door 174 pivotably attached to the side of system 100. Portable data storage media can be placed in the system, or in the alternative, removed from the system, via station 172 and access door 174.

Figure 2:
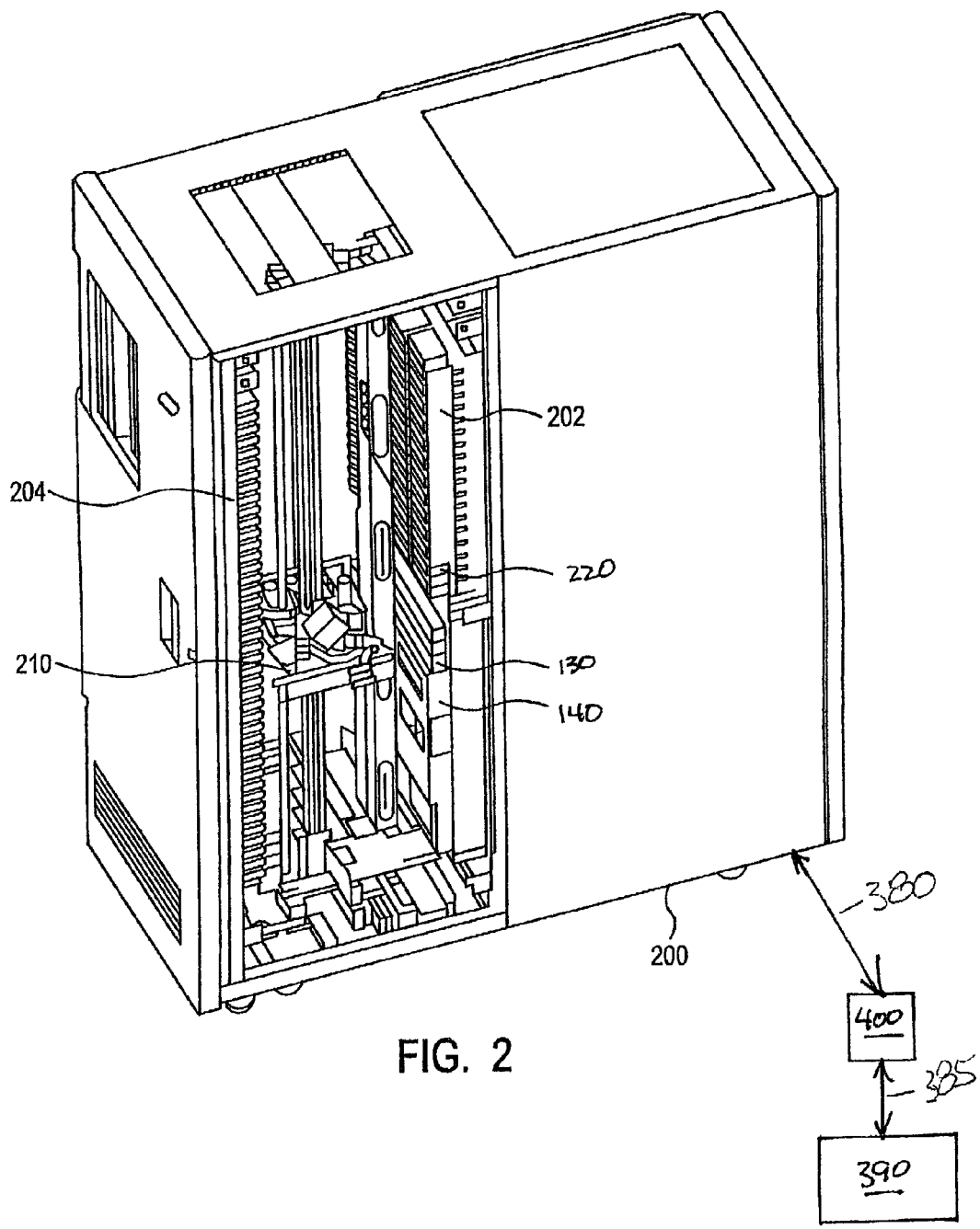
FIG. 2 is a perspective view of a second embodiment of Applicant's data storage and retrieval system.

FIG. 2 shows system 200 which comprises another embodiment of Applicant's data storage and retrieval system. System 200 communicates with one or more host computers, such as host computer 390, via one or more communication links, such as communication links 380 (FIGS. 1, 2, 3, 4) and 385 (FIGS. 1, 2, 3, 4, 6A, 6B, 7) and a Network Attached Storage ("NASD") device, such NASD 400 (FIG. 4). Communication links 380 and 385 comprise, for example, a serial interconnection, such as an RS-232 cable or an RS-432 cable, an ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

System 200 includes first storage wall 202 and second storage wall 204. Storage walls 202 and 204 each include a plurality of storage elements in which can be stored a plurality of portable data storage media. System 200 includes one or more input/output devices, such as devices 130 and 140. Input/output device 130/140 each comprise a floppy disk drive, an optical disk drive, a magnetic tape drive, and the like. System 200 further includes controller/motion card pack 160. System 200 further includes operator control panel 150 (not shown in FIG. 3).

System 200 further includes one or a plurality of portable data storage cartridges removeably disposed in one or more slots in storage walls 202/204. Each such cartridge contains a data storage medium internally disposed therein. Such data storage media includes optical media, magnetic media, tape media, electronic media, and combinations thereof. System 200 also includes at least one robotic accessor 210 for transporting a designated portable data storage medium between a storage slot disposed in first wall 202 or second wall 204 and input/output device 130/140.

Referring now to FIG. 3, in prior art systems a host computer, such as host computer 330, communicates with, inter alia, a prior art Network Attached Storage Device, such as NASD 300. Information is transferred between the host system and secondary storage devices managed by a data storage and retrieval system, such as data storage and retrieval system 320, via NASD 300.

NASD 300 includes networking software 340 which communicates with one or more host computers, such as host computer 330, via communication link 385 (FIGS. 1, 2, 3, 4, 6A, 6B, 7). Networking software 340 is interconnected with a Direct Access Storage Device ("DASD"), such as DASD 350, through a file system 360 and a file system driver 370. NASD 300 further includes storage management software 310 which communicates with one or more data storage and retrieval systems, such as data storage and retrieval system 320, via communication link 380 (FIGS. 1, 2, 3, 4) and with DASD 350 via file system 360 and file system driver 370. In response to requests from one or more users, i.e. from one or more host computers, SMS 310 provides one or more files from DASD 350 to data storage and retrieval system 320 for backup.

Using prior art apparatus and methods, host computer 390 and SMS 310 can both access DASD 350. Using the prior art NASD 300, however, SMS 310 must necessarily use the same file system/file system driver that a host computer uses to access one or more user files. Therefore using prior art apparatus and methods, SMS 310 must separately provide each individual user file stored on DASD 350 to a data storage and retrieval system for backup. As a practical matter, SMS 310 must often separately access and provide tens of thousands of individual small user files to library 320 using the prior art apparatus and method.

FIG. 4 illustrates the hardware and software environment in which preferred embodiments of the present invention are implemented. Host system 390 comprises a computer system, such as a mainframe, personal computer, workstation, etc., including an operating system such as Windows, AIX, Unix, MVS, LINUX, etc. (Windows is a registered trademark of Microsoft Corporation; AIX is a registered trademark and MVS is a trademark of IBM Corporation; and UNIX is a registered trademark in the United States and other countries licensed exclusively through The Open Group.) The storage management program 310 in the NASD 400 may include the functionality of storage management type programs known in the art that manage the transfer of data to a data storage and retrieval system, such as the IBM DFSMS software or the IBM Tivoli Storage Manager software.

The IBM DFSMS software is described in "DFSMS/MVS V1R4 General Information," IBM document no. GC26-4900-05, published by IBM (Copyright 1997, IBM), which publication is incorporated herein by reference in its entirety. The IBM TIVOLI Storage Manager software is described in "Tivoli Storage Manager for Windows Using the Backup-Archive Client," IBM Document Number SH26-4117-01, "Tivoli Storage Manager for Windows Administrator's Guide," IBM Document Number GC35-0410-02, and "Tivoli Storage Manager for Windows Administrator's Reference," IBM Document Number GC35-0411-02, and those IBM publications are incorporated herein by reference.

In addition to including known storage management program functions, such as recall and migration, the storage management program 310 would further include additional program instructions to perform the operations of the preferred embodiments of the present invention. The storage management program 310 may be implemented as a separate, installed application program. Alternatively, storage management program 310 may include device drivers, backup software, and the like.

The data storage and retrieval system 320 comprises, for example system 100 (FIG. 1)/system 200 (FIG. 2), and manages, for example, a plurality of tape drives and tape cartridges. In such tape drive embodiments, the tape drives may be any suitable tape drives known in the art, e.g., the TotalStorage™ 3590 tape drives. (TotalStorage is a trademark of IBM Corporation). In those tape drive embodiments, the tape media may be disposed in any suitable tape cartridge device known in the art, such as ECCST, TotalStorage™ IBM 3420, 3480, 3490E, 3590 tape cartridges, etc.

Applicant's NASD 400 includes SMS 310 which communicates with data storage and retrieval system 320 via communication link 380 (FIGS. 1, 2, 3, 4). SMS 310 also communicates with DASD 350 via file system 410 and file system driver 420. NASD 400 further includes networking software 340 which communicates with one or more host computers using communication link 385 (FIGS. 1, 2, 3, 4, 6A, 6B, 7). Networking software 340 communicates with DASD 350 via file system 430 and file system driver 440. Communication links 380 (FIGS. 1, 2, 3, 4) and 385 (FIGS. 1, 2, 3, 4, 6A, 6B, 7) comprise a serial interconnection, such as an RS-232 cable or an RS-432 cable, an ethernet interconnection, a gigabit ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

In certain embodiments, NASD 400 is integral with host computer 390. In certain embodiments, NASD 400 is integral with a data storage and retrieval system. In certain embodiments, NASD 400 is external to one or more host computers and one or more data storage and retrieval systems. In the embodiment shown in FIG. 4, NASD 400 communicates with a single host computer, i.e. host 390. In other embodiments, NASD 400 communicates with more than one host computer.

Figure 5:
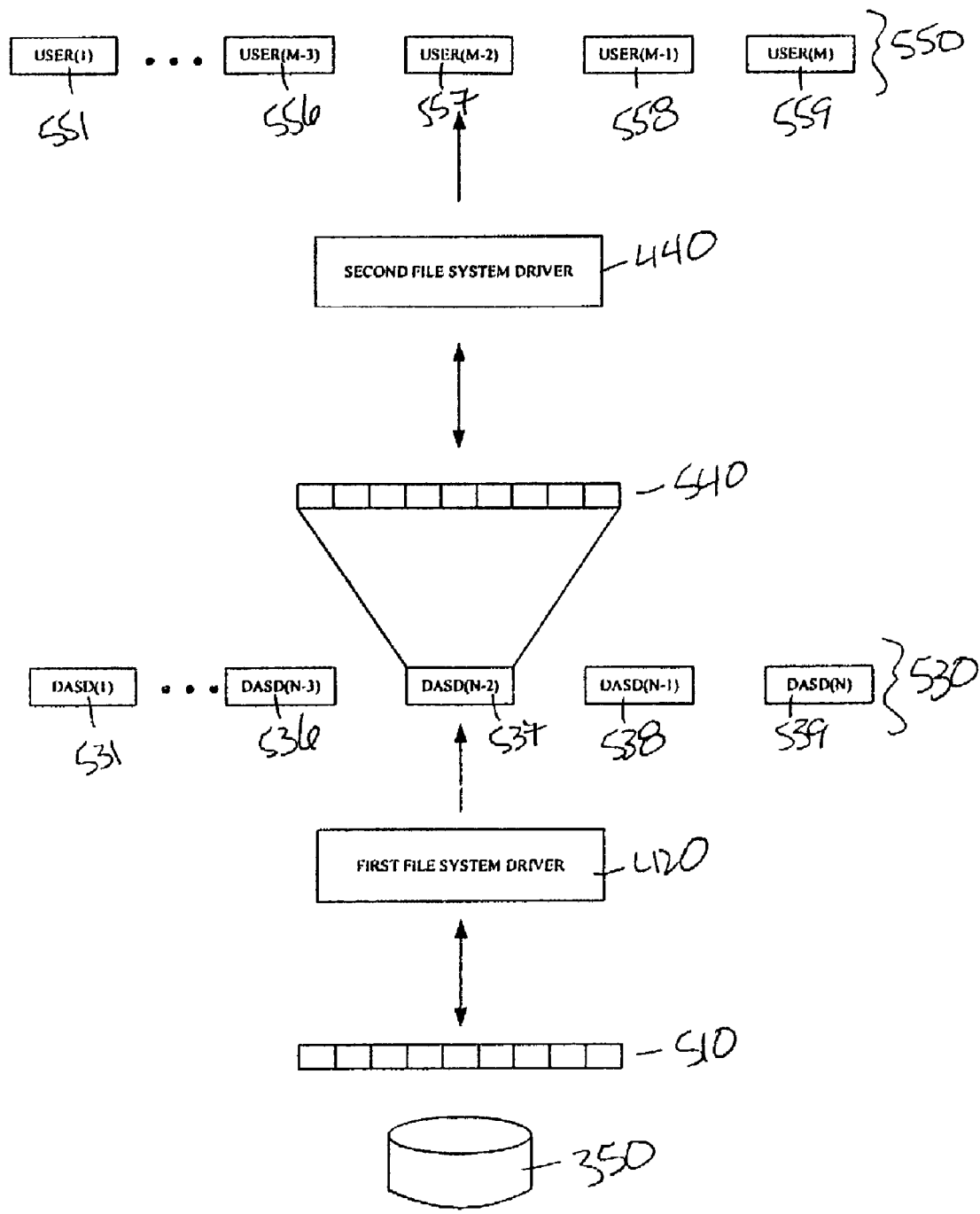
FIG. 5 is a block diagram showing Applicant's file management protocol.

Referring now to FIG. 5, Logical Block Array ("LBA") 510 comprises a plurality of DASD files 530 stored on DASD 350. In certain embodiments, LBA 510 includes all the DASD files stored on DASD 350. In certain embodiments, LBA 510 includes fewer than all the DASD files stored on DASD 350. File system 410 (FIG. 4) includes LBA 510. The plurality of DASD files 530 comprises (N) individual DASD files, such as DASD files 531, 536, 537, 538, and 539.

Each of the (N) DASD files 530 comprises a plurality of individual host computer files. For example, DASD files 537 comprises Logical Block Array ("LBA") 540. LBA 540 includes (M) host computer files 550. In certain embodiments LBA 540 comprises all the host computer files comprising DASD file 537. In certain embodiments, LBA 540 includes fewer than all the host computer files comprising DASD file 537.

A user, such as host computer 390 (FIG. 3), accessing DASD 350 uses file system driver 440 which provides file system 410 which includes all that user's host computer files stored on DASD 350. Therefore, when a user accesses DASD 350 that user "sees" each individual host computer file stored on DASD 350.

On the other hand, SMS 310 accesses DASD 350 using file system driver 420 which provides file system 410 which includes only DASD files. Thus, when SMS 310 accesses DASD 350, SMS 310 does not "see" each individual host computer file. Rather, SMS 310 "sees" only file system 410 comprising DASD files. Therefore, when SMS 310 accesses DASD 350 to provide the files stored thereon to a data storage and retrieval system for copying, SMS 310 provides (N) DASD files to the data storage and retrieval system, where each of those DASD files comprises (M) individual host computer files.

Figure 6A:
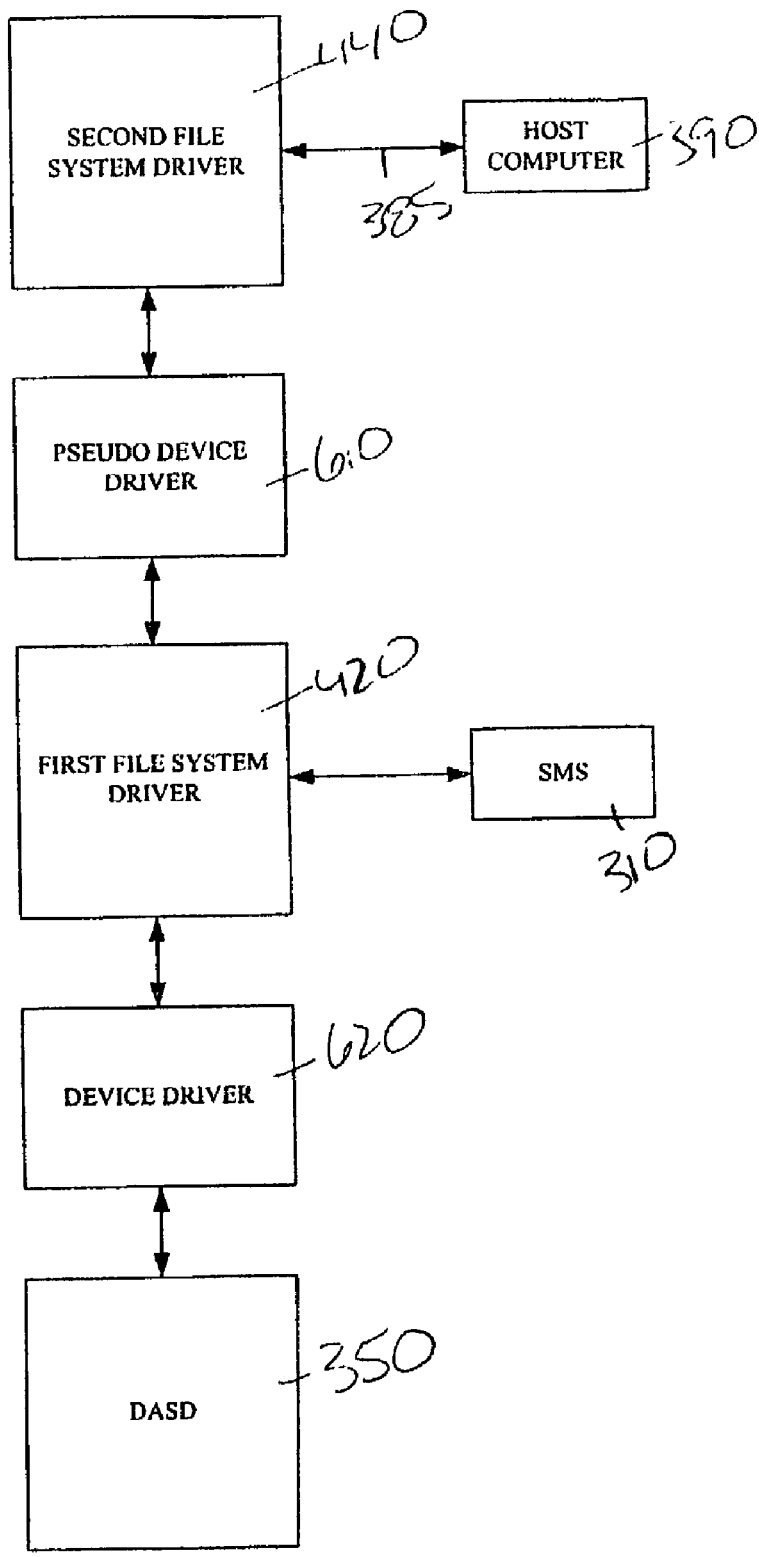
FIG. 6A is a block diagram of one embodiment of Applicant's file system drivers and device drivers.

Referring now to FIG. 6A, in one embodiment of Applicants' apparatus and method a host computer, such as host computer 390 (FIG. 3) requests a host computer file stored on DASD 350 via file driver 440 and communication link 385 (FIGS. 1, 2, 3, 4, 6A, 6B, 7). File system driver 440 then communicates with file system driver 420 via pseudo device driver 610. File system driver 420 determines the DASD file which includes the selected User file, retrieves that DASD file, and provides that DASD file to file system driver 440. File system driver 440 then retrieves the selected host computer file from the provided DASD file.

As those skilled in the art will appreciate, an operating system is interposed between applications and the physical hardware. The kernel comprises the essential part of an operating system. Such a kernel is generally responsible for resource allocation, low-level hardware interfaces, security, and so forth. Some operating systems have a great deal of functionality implemented in the kernel. Such operating systems are sometimes said to include a monolithic kernel.

Other operating systems comprise what is sometimes called a microkernel which implements only a bare minimum, with the remaining features require small modules which can be flexibly configured. A monolithic kernel is much faster than a microkernel, though a microkernel can dynamically load and unload modules as needed to reduce resource usage.

Figure 6B:
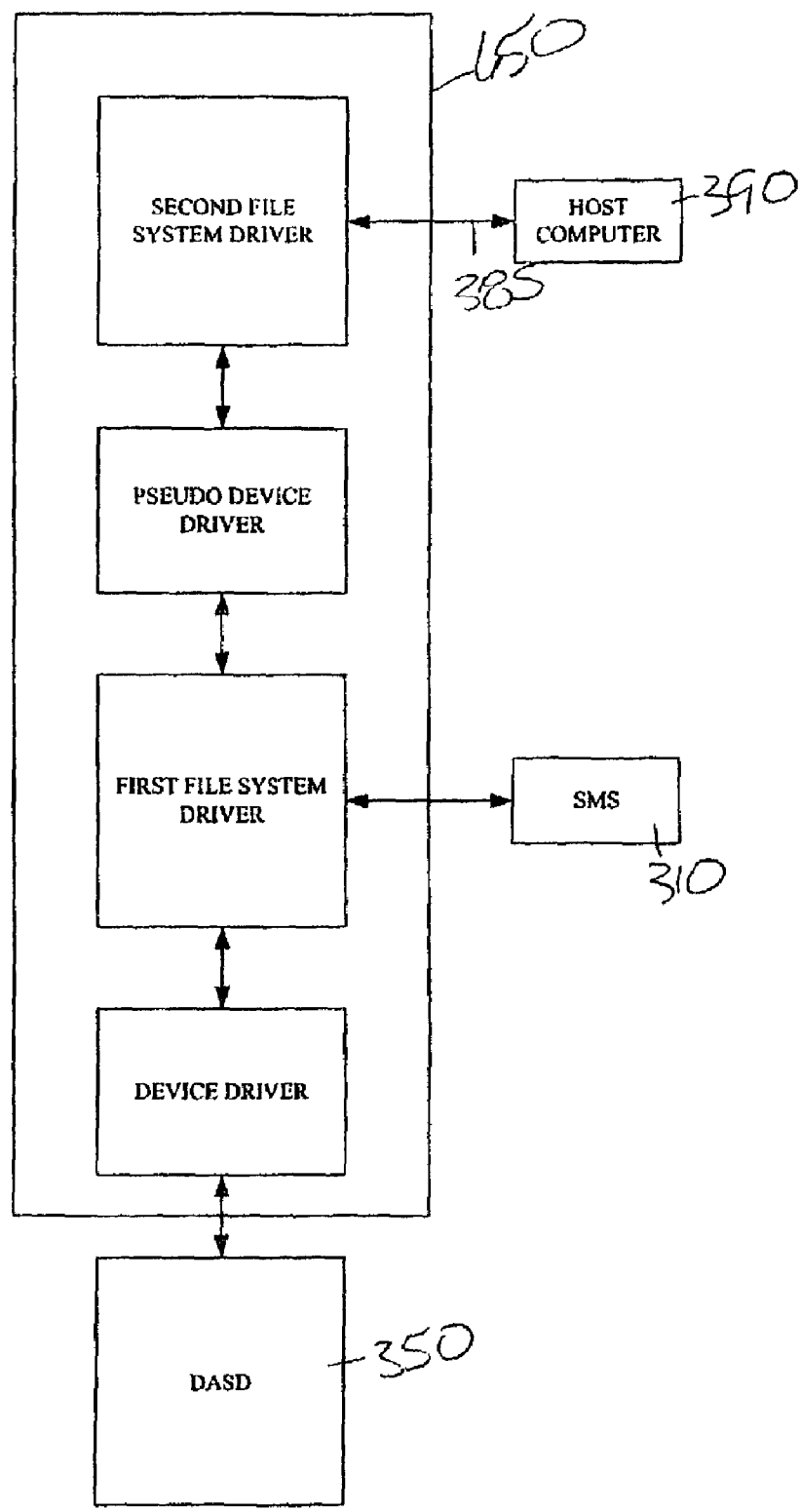
FIG. 6B is a block diagram of an operating system which includes Applicant's file system drivers and device drivers.

In embodiments wherein NASD 400 is external to the attached host computers, such as host computer 390 (FIG. 3), and is external to the attached data storage and retrieval systems, such as data storage and retrieval systems 100 (FIG. 1)/200 (FIG. 2), NASD 400 (FIG. 4) includes an operating system. In the embodiment of FIG. 6A, NASD 400 includes a micro kernel type operating system wherein one or more of file system driver 440, pseudo device driver 610, file system driver 420, and/or device driver 620, comprise modules implemented separately from the NASD operating system. Referring to FIG. 6B, operating system 650 includes the functions of file system driver 440, pseudo device driver 610, file system driver 420, and device driver 620. In the embodiment of FIG. 6B, NASD 400 includes a monolithic operating system 650.

Figure 7:
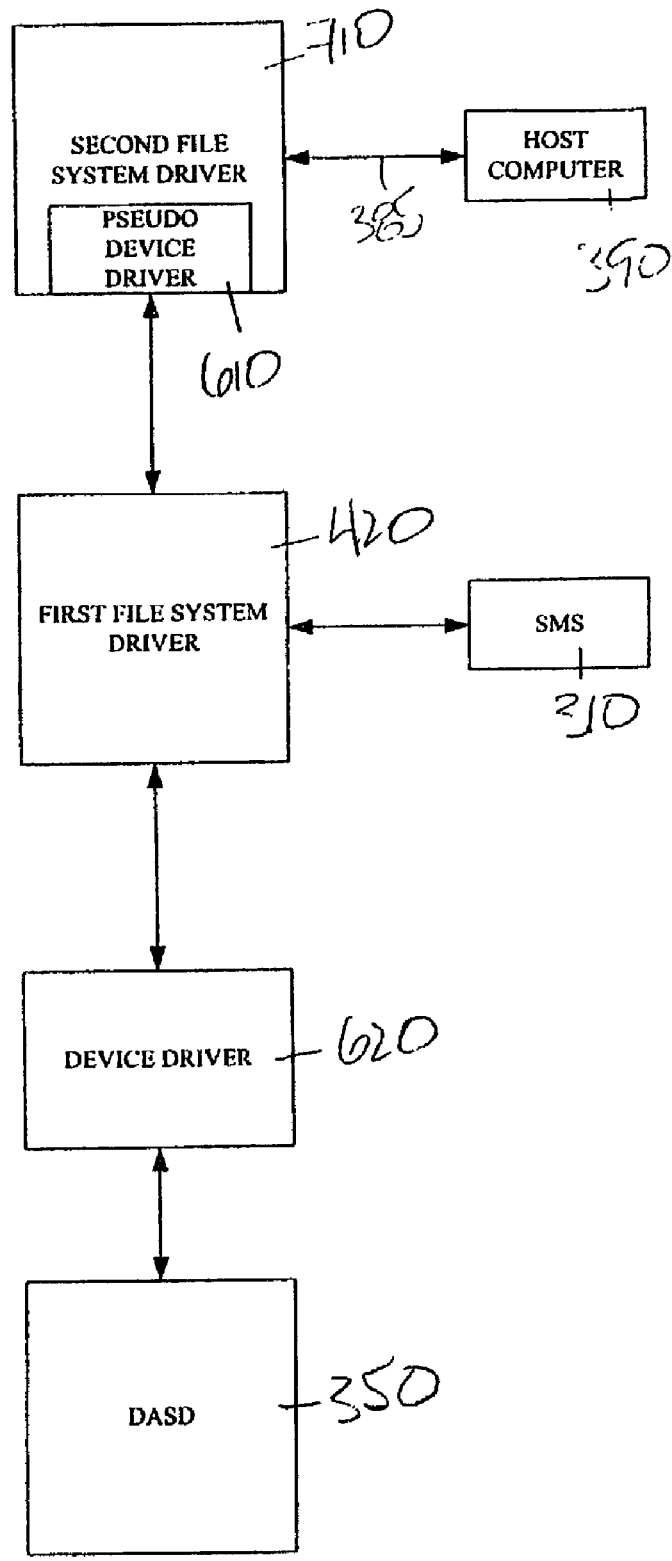
FIG. 7 is a block diagram of a second embodiment of Applicant's file system drivers and device drivers.

Referring now to FIG. 7, in another embodiment of Applicants' apparatus and method a host computer, such as host computer 390 (FIG. 3) requests a host computer file stored on DASD 350 via file system driver 710 and communication link 385 (FIGS. 1, 2, 3, 4, 6A, 6B, 7). File system driver 710 includes pseudo device driver 610. File system driver 710 communicates with file system driver 420. File system driver 420 determines the DASD file which includes the requested host computer file, retrieves that DASD file, and provides that DASD file to file system driver 710. File system driver 710 then retrieves the requested host computer file from the provided DASD file. In the embodiment of FIG. 7, NASD 400 includes a micro kernel type operating system wherein the functions of second file driver 440 and pseudo device driver 610 are implemented in a single module.

In certain embodiments, the file system 430 (FIG. 4) comprises a "rewriteable" file system. In such a rewriteable file system, LBA 540 (FIG. 5) is divided into several areas, which may or may not be contiguous. File system 430 itself is described by what is sometimes called a superblock. The superblock contains pointers to several other areas, including: one or more allocation tables, which indicate which sectors are in use, and one or more inodes, each of which describes one file or directory. Each inode contains information about a single file or directory, and contains pointers to the sectors containing the file or directory's data.

When the file system driver 440 (FIG. 4) creates a new file, sectors are allocated for that file's data; this means that the allocation tables must be rewritten. Next, the file's inode is updated to point to the data blocks. The data blocks of the directory containing the file must be modified to reflect the new file's addition. Finally, the superblock must be updated. As those skilled in the art will appreciate, much rewriting takes place, even for a very simple file system operation.

In certain embodiments, the file system 430 comprises a non-rewriteable file system, i.e. a Write Once/Read Many Times ("WORM") file system. In these embodiments, Applicant's WORM-like file system driver 440 never rewrites a single sector. As in a traditional file system, the superblock describes the entire file system. Using Applicant's second file system driver, however, the superblock, the allocation tables, and the inodes are written in new places when necessary.

For example, a new user file directory starts off as a set of data blocks containing the root directory, a single inode describing the root directory, allocation tables that indicate the usage of the inode, and a superblock that points to each of these items. A superblock link, which is found at a known location on the medium, points to the first superblock.

In the event a new user file is added to the logical block array 540, that file's data must be stored, and the root directory must be modified. A new inode must be allocated, and the allocation tables must be adjusted accordingly. All this new information must be written to a blank part of the logical medium. In certain embodiments, Applicant's file system driver 440 writes that new information after the first superblock. Finally, a new superblock is written. A new link is made from the sector immediately following the previous superblock to the new superblock.

Applicant's method continues using Applicant's file system driver 440 as new files are written to logical block array 540. The data storage medium is consumed in a contiguous fashion, from one end to the other. As a general matter, most of the data within the second logical block array remains unchanged as that second logical block evolves, and a superblock may point to data far back into the file system. In fact, if a user file is extended, then the old part of that user file is left intact, while the new part is written at the end of the medium.

Applicant's invention includes a method to backup host computer files. Applicant's method includes using the various embodiments of NASD 400 described above. In certain embodiments of Applicant's method, NASD 400 is integral with a data storage and retrieval system. In certain embodiments of Applicant's method, NASD 400 is integral with a host computer.

Figure 8:
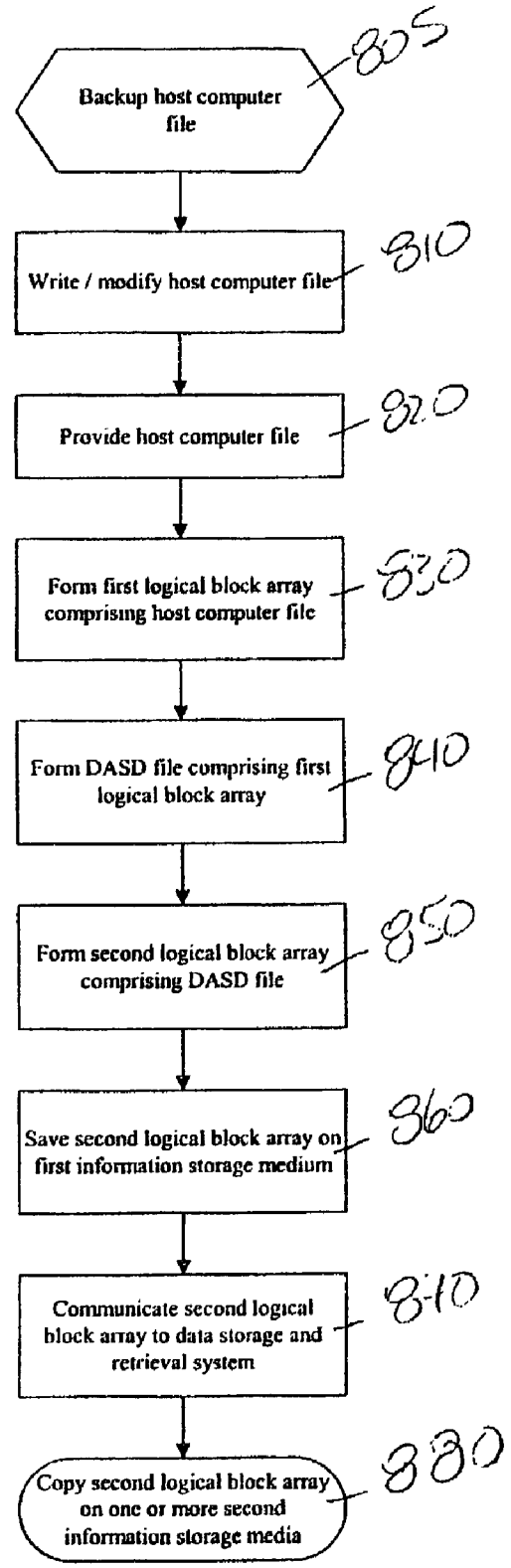
FIG. 8 is a flow chart summarizing the steps of Applicant's method.

Referring now to FIG. 8, Applicant's method begins at step 805. In certain embodiments of Applicant's method, a new host computer file is written in step 810. In certain embodiments of Applicant's method, an existing host computer file is modified in step 810. Applicant's method transitions from step 810 to step 820 wherein the host computer file of step 810 is provided to Applicant's NASD 400. Applicant's method transitions from step 820 to step 830 wherein Applicant's method forms a first logical block array, such as LBA 540 (FIG. 5), comprising that host computer file. In certain embodiments, step 830 includes using a file system driver 440 (FIG. 4). In certain embodiments, the file system driver of step 830 comprises a WORM-like file system driver.

Applicant's method transitions from step 830 to step 840 wherein Applicant's method forms a DASD file comprising the first logical array formed in step 830. Applicant's method transitions from step 840 to step 850 wherein Applicant's method forms a second logical block array, such as LBA 510, comprising the DASD file of step 840. Applicant's method transitions from step 850 to step 860 wherein the second logical block array of step 850 is saved at a first time on a first information storage medium. In certain embodiments, the first information storage medium of step 860 comprises a direct access storage device, such as DASD 350 (FIG. 3). In certain embodiments the DASD of step 860 comprises a redundant array of independent disks ("RAID"). In certain embodiments, such an array of disks utilizes one or more the known RAID data storage protocols.

Applicant's method transitions from step 860 to step 870 wherein Applicant's method at a second time provides the second logical block array of step 850 to one or more data storage and retrieval systems, such as data storage and retrieval systems 100 (FIG. 1)/200 (FIG. 2). Applicant's method transitions from step 870 to step 880 wherein Applicant's method copies the second logical block array on one or more second information storage media.

Examples of such second information storage media include magnetic tapes, magnetic disks of various types, optical disks of various types, electronic storage media, and the like. By electronic storage media, Applicants mean a device such as a PROM, EPROM, EEPROM, Flash PROM, compactflash, smartmedia, and the like. In certain embodiments, these one or more second information storage media comprise portable information storage media. In certain embodiments, the one or more second information storage media are individually housed in a portable information storage cartridges In certain embodiments, step 880 further includes retrieving one or more portable information storage media, transporting those one or more portable information storage media to one or more data storage devices, such as data storage devices 130 (FIGS. 1, 2)/140 (FIGS. 1, 2), and removeably disposing those one or more portable information storage media in those one or more data storage devices.

Applicants' invention further includes an article of manufacture comprising a computer useable medium having computer readable program code disposed therein method to copy one or more host computer files to one or more portable information storage media. Applicants' invention further includes a computer program product usable with a programmable computer processor having computer readable program code embodied therein method to copy one or more host computer files to one or more portable information storage media.

While the preferred embodiments of the present invention have been illustrated in detail, it should be apparent that modifications and adaptations to those embodiments may occur to one skilled in the art without departing from the scope of the present invention as set forth in the following claims.

We claim:

1. A network attached storage device, wherein said network attached storage device is capable of communicating with one or more host computers, and wherein said network attached storage device is capable of communicating with one or more data storage and retrieval systems, comprising:
   an information storage device;
   a first file system driver, wherein said first file system driver is in communication with said information storage device;
   a second file system driver, wherein said second file system driver is in communication with said first file system driver;
   a plurality of first computer files stored on said information storage device;
   a plurality of second computer files;
   wherein one or more of said plurality of first computer files comprises two or more of said plurality of second computer files.

2. The network attached storage device of claim 1, further comprising:
   a first logical block array comprising said plurality of first computer files; and
   a second logical block array comprising said plurality of second computer files.

3. The network attached storage device of claim 1, further comprising:
   a storage management program capable of communicating with one or more of said one or more data storage and retrieval systems and with said information storage device;
   networking software, wherein said networking software is capable of communicating with said one or more host computers;
   a first device driver, wherein said first device driver communicates with said first file system driver and with said information storage device; and
   a second device driver, wherein said second device driver communicates with said second file system driver and with said first file system driver.

4. The network attached storage device of claim 3, further comprising:
   a first file system comprising said first logical block array; and
   a second file system comprising said second logical block array.

5. The network attached storage device of claim 4, wherein said second file system comprises a rewriteable file system.

6. The network attached storage device of claim 4, wherein said second file system comprises a WORM file system.

7. A network attached storage device, wherein said network attached storage device is capable of communicating with one or more host computers, and wherein said network attached storage device is capable of communicating with one or more data storage and retrieval systems, comprising:
   an information storage device;
   a storage management program capable of communicating with one or more of said one or more data storage and retrieval systems and with said information storage device;
   a first file system driver, wherein said first file system driver is in communication with said information storage device;
   networking software, wherein said networking software is capable of communicating with said one or more host computers;
   a second file system driver, wherein said second file system driver is in communication with said networking software;
   a plurality of first computer files stored on said information storage device;
   a plurality of second computer files;
   wherein one or more of said plurality of first computer files comprises two or more of said plurality of second computer files;
   a first logical block array comprising said plurality of first computer files;
   a second logical block array comprising said plurality of second computer files;
   a first device driver, wherein said first device driver communicates with said first file system driver and with said information storage device;
   a second device driver, wherein said second device driver communicates with said second file system driver and with said first file system driver;
   a first file system, wherein said first file system comprises said first logical block array;
   a second file system, wherein said second file system comprises said second logical block array, and wherein said second file system comprises a Write Once Read Many times file system; and
   an operating system.

* * * * *